UNITED STATES PATENT OFFICE.

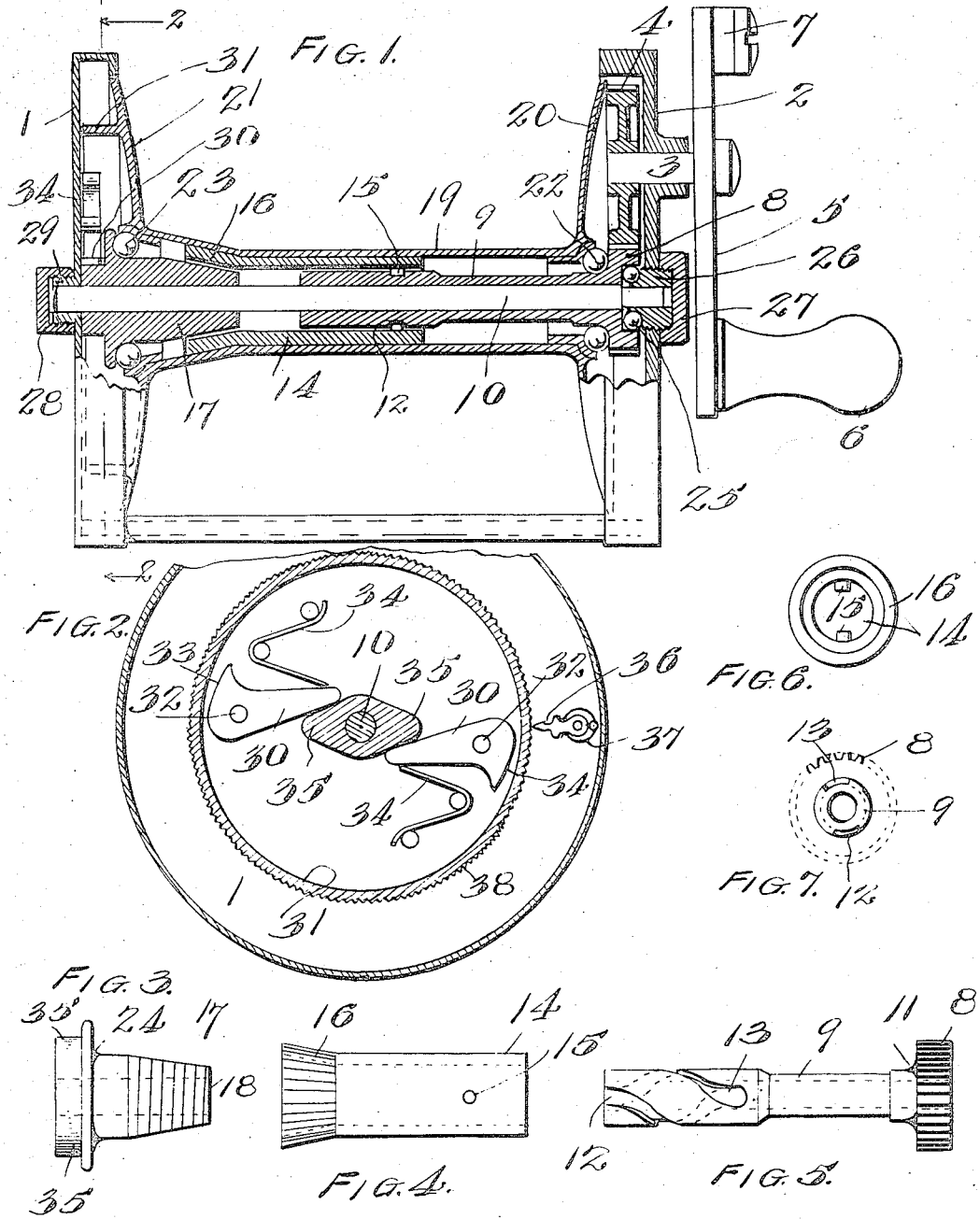

FREDERICK C. SCHRAMM, OF NEW ORLEANS, LOUISIANA.

FISHING-REEL.

1,145,038.        Specification of Letters Patent.      Patented July 6, 1915.

Application filed July 18, 1914. Serial No. 851,773.

*To all whom it may concern:*

Be it known that I, FREDERICK C. SCHRAMM, a citizen of the United States of America, residing at New Orleans, in the parish of Orleans and State of Louisiana, have invented certain new and useful Improvements in Fishing-Reels, of which the following is a specification.

The present invention relates to improvements in fishing reels, and is designed primarily, to provide a device of this character which may be manipulated with facility to wind the line upon the spool, or to apply a braking device to retard unwinding of the spool, and to furnish a device in which the spool is free to run when desired.

The invention consists in certain novel combinations and arrangements of parts as will hereinafter be more fully described and claimed.

In the accompanying drawings I have illustrated one complete example of the physical embodiment of my invention constructed according to the best mode I have so far devised for the practical application of the principles of the invention, but it will be understood that I contemplate changes within the scope of my invention which may be applied to its physical embodiment without departing from the spirit of the invention.

Figure 1 is a vertical sectional view of the reel, parts being shown in elevation, showing the interior construction and the novel features of the invention. Fig. 2 is a sectional view on line 2—2, Fig. 1. Fig. 3 is an elevation of a bushing forming part of the braking device. Fig. 4 is an elevation of the barrel which forms a part of the coupling device of the reel. Fig. 5 is an elevation of a driving sleeve. Fig. 6 is an end view of the barrel of Fig. 4. Fig. 7 is an end view of the sleeve of Fig. 5.

In the exemplification of the invention as illustrated, the reel is of conventional form and outline and embodies the two brass end plates 1 and 2, which are of usual or suitable construction. The end plate 2 has a bearing therein for the pintle 3 upon which the cog wheel 4 is fixed, and this cog wheel may be turned by the winding handle 5 which is formed with a hand grasp 6 and at its opposite end is provided with a counterbalancing weight 7.

The cog wheel 4 meshes with a pinion 8 which is smaller in diameter than the cog wheel 4, and this pinion is integral with the sleeve 9 which is bored for the shaft 10. The sleeve 9 is formed with a cone or ball race 11, adjacent the pinion 8, and at its end opposite the pinion, the sleeve is grooved as at 12 and 13. These grooves 12 and 13 are spirally arranged about the perimeter of the sleeve, and as clearly seen in Fig. 5, each groove extends one-half the distance around the circumference of the sleeve.

In connection with the sleeve 9 and its grooves, I employ a cylindrical barrel 14 which has an interior diameter or bore sufficient to accommodate the sleeve 9 which it incloses. This barrel 14 has two interior lugs or pins 15 that project into the grooves 12 and 13, which at all times are in engagement with these grooves. The barrel is open at both ends, and the left end in the drawings is shown as outwardly tapering or conical as at 16. This tapered formation of the barrel 14 is designed to co-act with the conical or tapered bushing 17 which is supported on the shaft 10 and has its tapered end 18 projected within the tapered end of the barrel 14.

The spool 19 which surrounds and incloses the sleeve barrel and bushing, is provided with the usual side flanges 20, 21, and the circular edges of these flanges are inclosed within the end brass plates as usual. The spool is supported upon bearing balls 22, 23, the former being located between the race 11 of the sleeve 9 and the spool, and the latter located between the race 24 on bushing 17 and the spool. The pinion 8 is also supported on ball bearings as 25, and the series of balls engage the exteriorly threaded cone 26, which surrounds the end of the shaft 10. By means of the screw threads on this cone, it is screwed into the central perforation in the end plate 2, and then the end cap 27 is screwed over this cone 26 in order to secure the parts in stable position. The opening in the cone 26 for the shaft 10, preferably extends through the cone, in order that the shaft may be oiled through this opening when the cap 27 is removed. The opposite end of the reel is provided with a cap 28 which is screwed on to a threaded flange 29 on the end brass plate 1.

The end brass plate 1 carries a pair of cam levers 30 which are designed to co-act with a brake band 31 integral with the flange 21 of the spool 19. These two cam levers 30 are pivoted at 32 to the end plate 1, and their cam faces 33 are in position to frictionally engage the interior periphery of the brake band or ring 31. Each cam lever has a flat spring 34 urging it in frictional contact with a cam lug 35 which is integral with the bushing 17, and in Fig. 2, it will be apparent that when the bushing 17 is revolved in the proper direction, these cam lugs will turn the cam levers so that their faces will engage the brake band 31. These cam levers are held normally inoperative by the springs 34.

In Fig. 2, I have illustrated a "clicking" device, which comprises a pawl 36 pivoted on the interior face of the end plate 1, and resiliently held by the spring 37. This pawl is adapted to contact with the teeth 38 on the exterior of the brake band 31, and as the brake band rotates a continuous clicking noise is provided which acts as an alarm or indication under certain conditions.

In Fig. 1 of the drawings, the spool is free to revolve upon its bearing balls 22 and 23. In order to wind the reel, the winding handle 5 is turned clockwise, and this movement rotates the gear wheel and pinion causing the barrel 14 to be pulled to the right in Fig. 1, and this movement causes frictional engagement between the spool 19 and the conical end 16 of the barrel 14, and a continuation of the winding movement will of course rotate the spool. To apply the brake the handle 5 is turned anti-clockwise, and through the cog wheel and pinion, the barrel 14 is moved to the left in Fig. 1, to engage the tapered conical bushing 17, and the bushing is thus revolved and with it the cam lugs 35. The movement of the lugs which bear upon the cam levers causes these levers to engage the brake ring or band 31, and the spool is thus either retarded or stopped altogether. As before stated, the spool is in a neutral position in Fig. 1, and is free to revolve.

From the above description taken in connection with my drawings it is apparent that I have provided a fishing reel comprising comparatively few elements, which are not liable to become disarranged or broken, and which provides a device which is facile and efficient in its operation, and comparatively cheap in first cost, as well as durable.

Having thus fully described my invention, what I claim as new and desire to secure by Letters Patent, is:—

1. The combination in a fishing reel including its spool, the end plates, and a winding handle, of an integral shaft journaled in the end plates, a sleeve loose on the shaft having an integral pinion, and a gear wheel supported in an end plate adapted to revolve said sleeve, a barrel having a tapered end adapted to engage the spool, a winding handle for revolving the gear, and connections between said sleeve and barrel to provide frictional engagement between said barrel and spool.

2. The combination in a fishing reel including a spool, end plates and shaft, of a sleeve on the shaft having duplicate spiral slots, a barrel embracing said sleeve and having pins engaging said slots, and formed with a conical portion adapted to engage the spool, and means for holding said sleeve whereby the barrel and spool are brought into frictional contact.

3. The combination in a fishing reel with its spool, shaft, and winding means, of a sleeve on the shaft forming part of the winding means, a tapered barrel embracing said sleeve and located within the spool, means for operatively connecting said sleeve and barrel whereby the barrel is made to frictionally engage the spool, and braking means adapted to be operated when engaged by said barrel.

4. The combination in a fishing reel with its spool and driving shaft, of a tapered barrel within the spool, a tapered bushing on the shaft, and means for rotating the shaft, end plates to the reel, a brake band on the spool, and braking devices attached to said end plate in position to engage said braking band when operated by the tapered bushing.

5. In a fishing reel, a braking device comprising a tapered barrel, a shaft, and a tapered bushing on the shaft, a spool having an integral brake band, end plates to the reel, and cam levers pivoted on one of said end plates in position to engage the braking band, and means on said bushing for actuating said cam levers.

In testimony whereof I affix my signature in presence of two witnesses.

FREDERICK C. SCHRAMM.

Witnesses:
JUSTIN GREEN,
C. A. FERGUSON.